United States Patent
Birling et al.

(10) Patent No.: US 11,646,582 B2
(45) Date of Patent: May 9, 2023

(54) SYSTEM AND METHOD FOR DISTRIBUTING ELECTRICAL POWER

(71) Applicant: HOMSPHERE SA, Genèva (CH)

(72) Inventors: François Birling, Cheseaux Noréaz (CH); Jean-François Affolter, Yverdons-les-bains (CH); Georges Berweiler, Eysins (CH)

(73) Assignee: Homsphere SA, Geneva (CH)

( * ) Notice: Subject to any disclaimer, the term of this patent is extended or adjusted under 35 U.S.C. 154(b) by 51 days.

(21) Appl. No.: 17/606,148

(22) PCT Filed: Apr. 24, 2020

(86) PCT No.: PCT/EP2020/061415
§ 371 (c)(1),
(2) Date: Oct. 25, 2021

(87) PCT Pub. No.: WO2020/216881
PCT Pub. Date: Oct. 29, 2020

(65) Prior Publication Data
US 2022/0200284 A1    Jun. 23, 2022

(30) Foreign Application Priority Data
Apr. 25, 2019 (EP) .................... 19170980

(51) Int. Cl.
*H02J 3/32* (2006.01)
*H02J 3/38* (2006.01)
*H02J 3/06* (2006.01)

(52) U.S. Cl.
CPC .............. *H02J 3/32* (2013.01); *H02J 3/06* (2013.01); *H02J 3/381* (2013.01); *H02J 2300/24* (2020.01)

(58) Field of Classification Search
CPC ...... H02J 3/32; H02J 3/06; H02J 3/381; H02J 3/38; H02J 2300/24
See application file for complete search history.

(56) References Cited

U.S. PATENT DOCUMENTS

| | | | |
|---|---|---|---|
| 2003/0047209 A1 | 3/2003 | Yanai et al. | |
| 2008/0167931 A1 | 7/2008 | Gerstemeier et al. | |
| 2016/0204610 A1 | 7/2016 | Matan et al. | |

FOREIGN PATENT DOCUMENTS

| | | | |
|---|---|---|---|
| EP | 2701266 A1 * | 2/2014 | ............... G05F 1/66 |
| EP | 2701266 A1 | 2/2014 | |

(Continued)

OTHER PUBLICATIONS

Corresponding International Patent Application No. PCT/EP2020/061415, International Search Report and Written Opinion, dated May 26, 2020. English Translation.

*Primary Examiner* — Robert L Deberadinis
(74) *Attorney, Agent, or Firm* — Cooper Legal Group LLC

(57) ABSTRACT

A system for managing the distribution of electrical power between at least two distinct buildings each comprising a domestic network connected to a local network is provided, said local network being connected to a public network. Each building comprises a power source, an inverter connected to said power source, a battery supplied with power by the inverter, and at least one apparatus operating using the power from the domestic network. The system comprises, in each building, a domestic module for regulating the power flow through the domestic network. The system comprises a central module connected to each domestic module making it possible to regulate the power flow between the local network and the public network, said central module being arranged so as to regulate the power flow between the buildings in order to allow an exchange of power between a (Continued)

domestic network in excess and a domestic network in deficit.

15 Claims, 2 Drawing Sheets

(56) References Cited

FOREIGN PATENT DOCUMENTS

EP 3021445 A1 5/2016
WO 2016176727 A1 11/2016

* cited by examiner

SYSTEM AND METHOD FOR DISTRIBUTING ELECTRICAL POWER

TECHNICAL FIELD OF THE INVENTION

The invention relates to a system for distributing electrical power as well as a method using the system according to the invention. The invention also relates to a method implemented by computer and a computer program.

STATE OF THE ART

Smart grids or smart networks (also called microgrids) are power distribution systems designed to optimize the consumption of power among several buildings. To do this, a portion of the power needs is furnished by a local source of power.

In particular, smart networks have been developed to address the difficulties of supplying power in certain regions of the world. Even now, 17% of the world's population lives with no access to electricity. Thanks to smart networks, solutions can be implemented on behalf of electrification of these regions.

A smart network is commonly composed of a renewable energy generator, a power generator using fossil fuel, energy storage means and a local distribution network. The homes, generators and the storage solution are connected on the local network.

The power furnished to homes is preferably power produced from the generator using a renewable energy, for example solar panels. If this supply is not enough to cover energy needs, the generator using a fossil fuel makes it possible to avoid power outages.

However, one of the disadvantages of existing microgrids is that the energy sources and storage means are shared. In other words, existing microgrids do not take into account the consumption habits of each home in order to optimize distribution and minimize having to use fossil fuel and/or nuclear energy.

OBJECT OF THE INVENTION

One object of the present invention is therefore to resolve the problems described above, and more particularly to provide a system and method for distributing power, making it possible to optimize management of the power generated by the power source of each building in order to avoid losses.

Another object of the present invention is to provide a system that minimizes consumption of electric power from the public network.

These objects are at least partially achieved by the present invention.

The present invention relates to a system for distributing electrical power among buildings in order to manage the distribution of electrical power between at least two distinct buildings, the system comprising a domestic network in each building, each domestic network being connected to a local network, said local network being connected to a public network, the system comprising in each building
a domestic power source for supplying the domestic network,
an inverter connected to said power source in order to convert the DC current generated by said power source into AC current,
a battery for storing the domestic power and for distributing it within the domestic network, the battery being supplied by the inverter, and
at least one apparatus operating using the power from the domestic network, the system comprising on the one hand a domestic module inside each building and on the other hand a central module connected to each domestic module, said domestic module for regulating the power flow in the domestic network between the source, the inverter, the battery and said apparatus based on the ratio defined by the available power Ed and the consumed power Ec on said domestic network, said domestic module being configured to calculate said ratio and to transmit said ratio to the central module, said central module being arranged to regulate the flow of power among the buildings based on the Ed/Ec ratios transmitted by each domestic module so as to allow an exchange of power between a domestic network in excess and a domestic network in deficit.

In the present invention, each domestic module regulates the power flow of a domestic network. For example, the domestic module distributes the available power to the apparatuses of the network. The domestic module calculates the Ed/Ec ratio and transmits this information to the central module.

The buildings, more specifically the domestic networks of the buildings, are connected to a local network. The local network is connected to a public network.

The central module manages the supply of power of each domestic network. For example, the central module controls the power source and the battery of each building. If a domestic module communicates a power deficit to the central module, the central module executes the necessary actions to compensate for such deficit. For example, a power deficit is defined by an Ed/Ec ratio of less than zero. In other words, the central module uses the information furnished by the domestic modules to regulate the power flow between the local network and the domestic networks.

The central module regulates the power flow between the domestic networks. If one network has a power deficit and another domestic network is in excess, the central module enables a transfer between the domestic network in excess and the domestic network in deficit.

The central module controls the transfer of excess power to the network in deficit. The transfer of power may take place between domestic networks. The transfer may take place between batteries, i.e., between the battery of a domestic network in power excess and the battery of the domestic network in deficit.

Alternatively, the transfer may take place between the battery of a network in excess and an apparatus connected to a domestic network in deficit.

Alternatively, the transfer may take place between the power source of a network in excess and the battery of a network in deficit.

In the present invention, there are 3 levels of networks: the domestic network, the local network and the public network. The buildings of the same local network are connected and can share the available energy produced by each of the buildings. If one of the buildings (or several buildings) of the local network has a power deficit, the other buildings of the local network can satisfy this deficit through the local network without having to use power from the public network. If at least one of the buildings is in excess, the deficit can be satisfied without using power from the public network.

In other words, the present invention allows using power available in the local network to meet the needs of domestic networks connected on the local network. Advantageously, this makes it possible to obtain a self-sufficient power system, particularly a self-sufficient system through optimizing the self-consumption of the power produced in the local network. This feature is not described in known energy distribution or microgrid systems of the prior art. Furthermore, this makes it possible to avoid electricity outages in the event of power failure of the public network.

When the power transfers among buildings of the same local network are free of charge, this allows users of each building to save energy costs corresponding to the purchase of power from the public network.

In one embodiment, said central module makes it possible to regulate the flow of power between the local network and the public network, in such a way that, when the local network has a power deficit, said central module allows an input of power from the public network to the local network.

According to one embodiment, said central module makes it possible to regulate the flow of power between the local network and the public network, in such a way that, when the local network is in power excess, said central module allows power output from the public network to the local network.

When the local network does not allow the needs of one or more domestic networks to be met, the central module activates the transfer of power between the public network and the local network, then controls the domestic module concerned in order to introduce the power into the domestic network in deficit. Conversely, when the local network is in power excess, the control module can control the transfer of power from the local network to the public network. This enables problems of storing power produced by the power sources of the buildings of the domestic networks to be solved. Consequently, the present invention makes it possible to produce power.

In one embodiment, the source of domestic power is a renewable energy source, for example selected from solar, wind, geothermy, biomass, preferably photovoltaic panels.

According to one embodiment, said batteries are chosen from lithium batteries, lead batteries, preferably lithium batteries.

In one embodiment, said apparatus is selected from a list comprising a heat pump, an electric vehicle, a light fixture, an awning, a ventilation system, a heating and/or cooling system, multimedia equipment such as television or computer, an alarm type security device, or a combination of these apparatuses.

Advantageously, the apparatuses are connected to controlled outlets. For example, the apparatuses are interconnected via a communication bus or via electrical outlets.

Advantageously, the present invention comprises a heat pump of the smart-grid ready type, in other words a heat pump controllable by a central module that controls its operation, particularly the timeframe of operation.

In one embodiment, said batteries have capacities of between 10 and 100 kWh.

According to one embodiment, said buildings are chosen from among individual houses and buildings comprising several dwellings.

In the present invention, the elements forming the system communicate with each other using one or more protocols.

For example, each domestic module uses a home automation protocol, for example KNX, for communicating among apparatuses. Advantageously, the present invention uses a particular protocol to provide communication among technical apparatuses such as, for example, ventilation, heating, water meter or electric meter, for example a ModBUS protocol.

Advantageously, the protocols are all incorporated in the domestic module that controls the apparatuses. Thus, information related to the apparatuses, particularly their needs for power, are centralized at the domestic module. The domestic module communicates this information to the central module which regulates the flow of power in the local network among the buildings based on said information.

The present invention also relates to a method for distributing electrical power among buildings in order to manage the distribution of electrical power between at least two distinct buildings, the method comprising:
  i) providing a system according to the present invention;
  ii) configuring the domestic module of each building so as to calculate the ratio between the available power Ed and the power consumed Ec on each domestic network;
  iii) providing the Ed/Ec ratio of each domestic module to the central module;
  iv) configuring the central module based on the Ed/Ec ratios of each domestic module in order to allow regulation of the power flows between the domestic network of each building and the local network, so that, for each building,
    iv)a) when Ed is greater than Ec, the central module activates the domestic module of the building to allow an output of the excess power from the domestic network of said building to the local network; or
    iv)b) when Ed equals Ec, the central module controls the domestic module of the building to block the flow of power between the domestic network of said building and the local network; or
    iv)c) when Ed is less than Ec, the central module activates the domestic management module of the building to allow an input of power from the local network to the domestic network of said building having a power deficit.

The advantages of the method according to the present invention are similar to those of the system and will therefore not be repeated here.

According to one embodiment, the excess power from a domestic network is used to charge the battery of a domestic network in deficit or to supply a domestic network in deficit.

In one embodiment, the excess power of a domestic network is introduced into the local network then into the public network.

According to one embodiment, the central module is configured to activate the input of electric power into at least one of the domestic networks in deficit over a predetermined timeframe.

In one embodiment, the central module is configured to compensate a domestic network in deficit, for example charging a battery in deficit, based on:
  meteorological parameters; and/or
  excess power available in another domestic network;

According to one embodiment, when a domestic network is in deficit, the central module is configured to use on a priority basis the excess power from another domestic network. If the available power on the local network is not available in sufficient quantity to overcome the deficit, the central module uses the public network to complete the supply of power.

The invention also relates to a method implemented by computer, wherein the method uses a computer program to execute the steps of the method according to the invention.

The invention also relates to a computer program comprising the instructions which, when the program is executed by a computer, make it possible to control a system according to the invention. Preferably, said program is arranged to control the central module so as to regulate the flow of power among the buildings and allow an exchange of power between a domestic network in excess and a domestic network in deficit.

The computer program may be stored in the central module. Alternatively, the program may be stored on a server or in the cloud.

In the present invention, the term "domestic module" defines a module for managing the electrical power of the domestic network. For example, the domestic module may be composed of a smart electric meter and apparatus(es) for communicating with the system for producing and storing renewable energy.

In the present invention, the term "central module" defines a module for managing the electrical power of the local network. For example, the domestic module may be an Energy Management System (EMS). For example, the central module may be an EMS composed of an automaton/computer, one or more communication modules and a smart electric meter.

The embodiments described for the system according to the present invention also apply to the method according to the invention, to the method implemented by computer and to the computer program, mutatis mutandis.

BRIEF DESCRIPTION OF THE FIGURES

Other advantages, purposes and specific features of the invention will be seen from the following non-limiting description of at least one specific embodiment of the device and of the method, objects of the present invention, with reference to the appended drawings in which.

DESCRIPTION OF EMBODIMENTS OF THE INVENTION

The present description is provided in a non-limiting manner, each feature of an embodiment being advantageously combinable with any other feature of any other embodiment. It will be noted now that the figures are not to scale.

Figure 1:
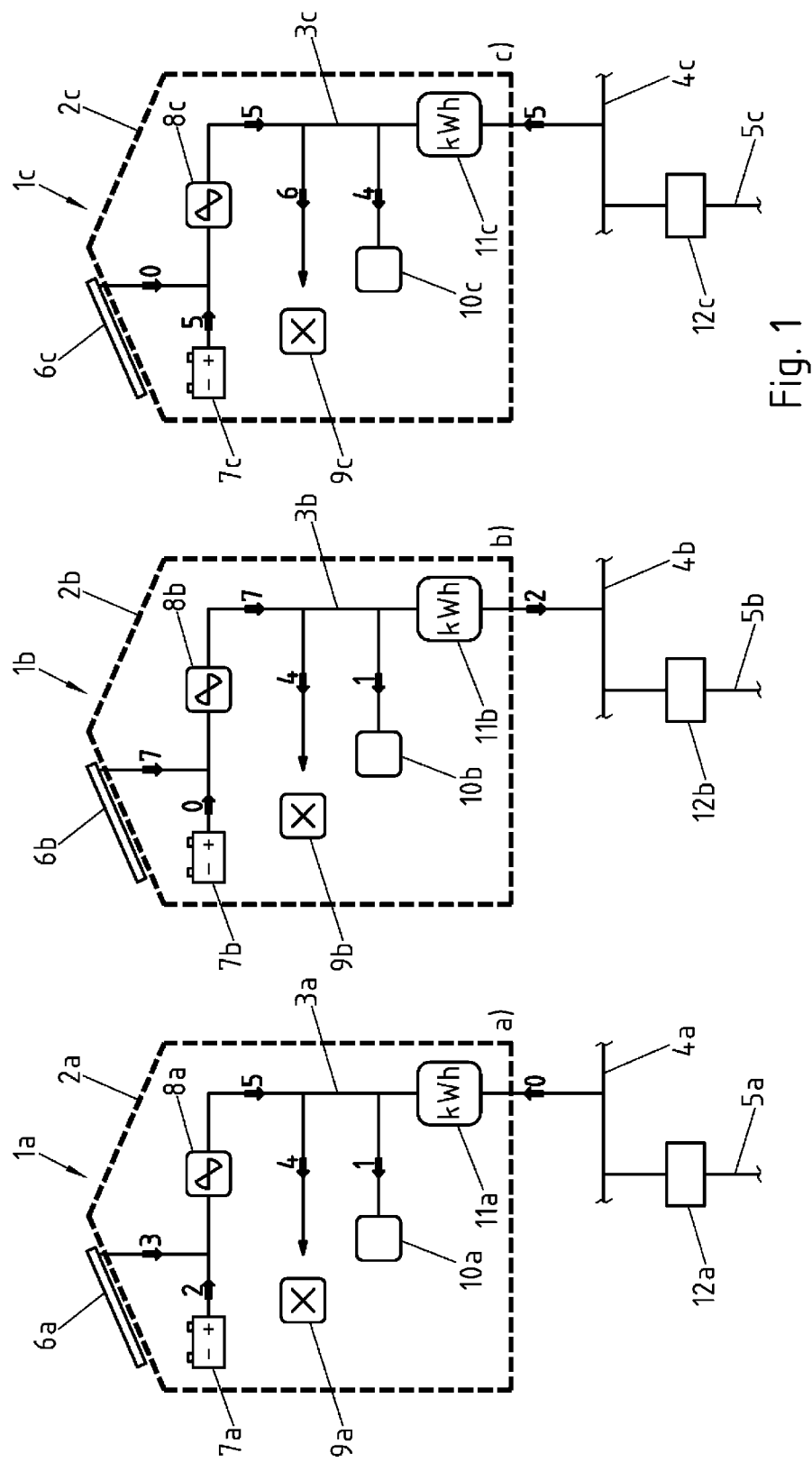
FIG. 1 represents three cases of figures for one building.

FIGS. 1a,b,c represent three possible situations for each building 2a,b,c of a system 1a,b,c according to the invention. FIGS. 1a,b,c each represent a building 2a,b,c of a system, the system not being illustrated in its entirety in FIG. 1.

The building 2a,b,c comprises a domestic network 3a,b,c connected to a local network 4a,b,c, said local network 4a,b,c being connected to a public network 5a,b,c.

Each building 2a,b,c comprises photovoltaic panels 6a,b,c as source of energy to supply the domestic network 3a,b,c.

The domestic network 3a,b,c comprises a lithium battery 7a,b,c connected to an inverter 8a,b,c to supply the electrical power to the domestic network 3a,b,c.

The power of the domestic network 3a,b,c makes it possible to supply the apparatuses 9a,b,c, for example a heat pump 10a,b,c.

Each building 2a,b,c further comprises a domestic module 11a,b,c to regulate the flow of power in the domestic network 3a,b,c. Each domestic module 11a,b,c is connected to a central module 12a,b,c which controls the supply of electric power of the domestic network 3a,b,c.

In FIGS. 1a,b,c, the arrows indicate a flow of power, each arrow being accompanied by a number indicating the amperage of the flow.

In FIG. 1a, the building 2a is in an ideal case of self-sufficiency because there is no exchange of power necessary between the domestic network 3a and the local network 4a. The available power Ed from the solar panels 6a and in the battery 7a corresponds to the consumed power Ec from the apparatuses of the building 2a. The sum of the amperages produced (3+2=5), corresponds to the necessary amperages for the apparatuses 9a and 10a (respectively 4 and 1), the ratio Ed/Ec is zero.

In the case represented in FIG. 1a, the central module 12a blocks the flow of power between the domestic network 3a and the local network 4a.

In FIG. 1b, the available energy Ed is greater than the consumed energy Ec, the ratio Ed/Ec=2. The domestic network 3b is thus in excess. The central module 12b allows an output of the excess power from the domestic network 3b to the local network 4b. This excess power may be used to compensate for a domestic network in deficit of the local network. If all the domestic networks are self-sufficient or also in excess, the central module 12b may allow excess power to be introduced into the public network 5b.

In FIG. 1c, the available energy Ed is less than the consumed energy Ec, the ratio Ed/Ec=−5. The domestic network 3c is thus in deficit. The central module 12c allows an input of power from the local network 4c. This energy introduced into the domestic network 3c may come from a domestic network in excess of the local network. If all the domestic networks are self-sufficient or also in deficit, the central module 12c introduces power from the public network 5c into the local network 4c then into the domestic network 3c to meet the needs for power of the domestic network 3c.

Figure 2:
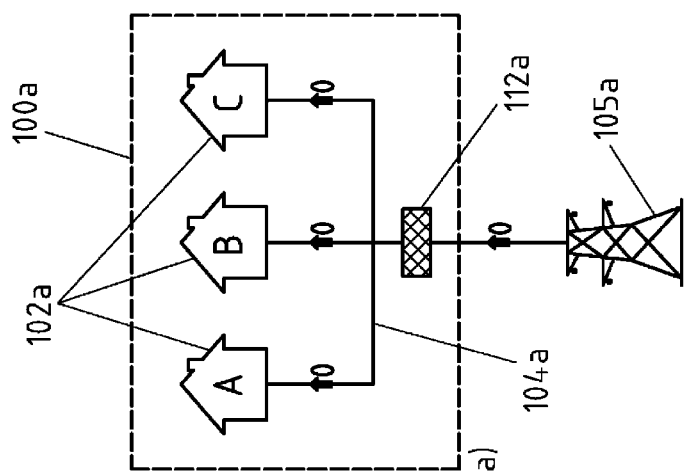
FIG. 2 represents three cases of figures for a set of buildings.
Figure 2:
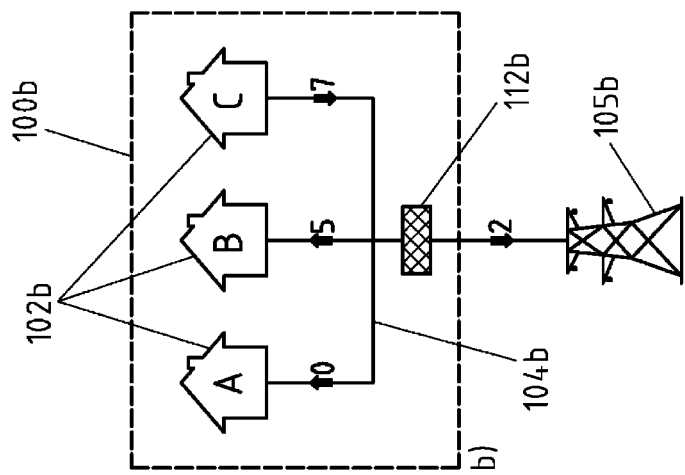
Figure 2:
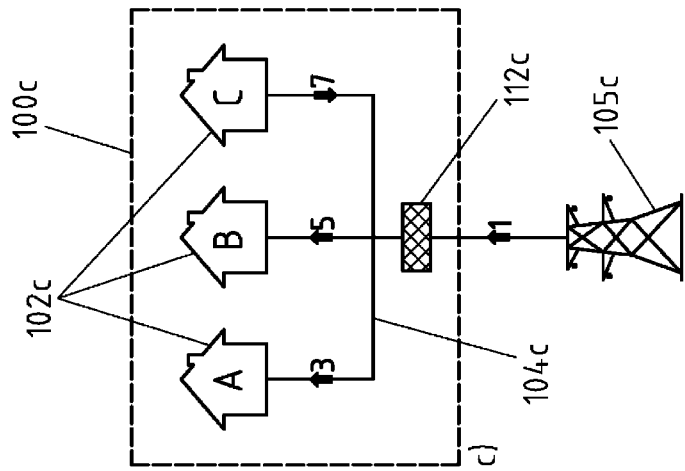

FIGS. 2a,b,c represent three possible situations for a system 100a,b,c according to the invention.

Each system 100a,b,c comprises three buildings 102a,b,c, the domestic networks whereof (not represented in FIGS. 2a,b,c) are connected onto a local network 104a,b,c, said local network 104a,b,c being connected onto a public network 105a,b,c. Each system 100a,b,c also comprises a central module 112a,b,c.

As for FIGS. 1a,b,c, the arrows indicate a flow of power, each arrow being accompanied by a number indicating the amperage of the flow.

In the case represented in FIG. 2a, the system 100a is self-sufficient, in other words each building 102a has a zero Ed/Ec ratio. The needs of the system 100a are provided solely by the available energy on the local network 104a.

In the case represented in FIG. 2b, the local network 104b of the system 100b has an excess balance of +2 (7−5=2) which may be introduced into the public network 105b since none of the buildings 102b is in power deficit. In this embodiment, the power deficit of a building is satisfied by the excess power from another building.

In the case represented in FIG. 2c, the situation is opposite to the one represented in FIG. 2b. The local network 104c of the system 100c has a deficit balance of −1 (−3−5+7=−1). The central module 112c thus authorizes a power input from the public network 105c to satisfy the power deficit of the system 100c. In this embodiment, the local network 104c does not have sufficient power resources to cover the needs of local network 104c, i.e., domestic networks connected to the local network 104c. In this case, the system 100c is configured to authorize an input of power from the public network 105c to avoid an electricity outage.

To show the present invention, in one embodiment the local network comprises 6 buildings, the buildings being individual houses. In a study over a period of 11 months (in other words over a period covering all 4 seasons), the applicant observed the following:

Power production of the 6 buildings: 47,578 kWh according to the following distribution: 15,665 kWh in self-consumption for all the buildings, in other words over the domestic networks; 7,060 kWh distributed over the local network; 24,853 kWh distributed over the public network;

Power consumption of the 6 buildings: 35,239 kWh according to the following distribution: 15,665 kWh in self-consumption for all the buildings in all of the domestic networks; 7,060 kWh from the local network; 12,514 kWh from the public network;

As shown by the data of this example, in the present invention the buildings are energy self-sufficient among them for 64% (44+20) of their energy needs.

The last third of the energy need is provided by the public network. This exchange is financially neutral because the buildings resell more energy (24,853 kWh or CHF 2,784) than they buy (12,514 kWh or CHF 2,366—the price per kWh purchased being higher than the price per kilowatt hour sold).

In conclusion, the 6 buildings of the local network are mostly both energy and financially self-sufficient.

The 6 buildings produced 35% solar energy in excess of their needs, this excess being made available to the public network.

Advantageously, each building is equipped with a device, for example a computer, a tablet or a smart phone. A program, for example a software program, is installed on the device, the program making it possible to monitor in real time the consumption of the house on the three networks, namely the domestic network, the local network and the public network.

In particular, the program may make it possible to know in real time the origin of the energy consumed by the building (i.e., by the apparatuses of the building): energy from the domestic network, from the local network or from the public network.

The program may also provide information about the flow of power among the different buildings on the local network. The program may also make it possible to know the power flows between the local network and the public network.

The program installed on each device is preferably connected to the central module, in particular to the program that controls the central module. This allows the user of the device to have access in real time to the data from the system, for example the origin of the energy, the power flows, the energy ratio of the buildings connected to the local network.

The program of the central module preferably records the consumption and production data of each building of the local network. For example, this makes it possible to define or adjust the energy strategies based on collected data, for example for the power source to use to meet the needs of a building at a given time.

REFERENCE NUMBERS

1a,b,c System according to the invention
2a,b,c Building of a system according to the invention
3a,b,c Domestic network
4a,b,c Local network
5a,b,c Public network
6a,b,c Photovoltaic panels
7a,b,c Lithium battery
8a,b,c Inverter
9a,b,c Apparatus
10a,b,c Heat pump
11a,b,c Domestic module
12a,b,c Central module
100a,b,c System according to the invention
102a,b,c Building of a system according to the invention
104a,b,c Local network
105a,b,c Public network
112a,b,c Central module

The invention claimed is:

1. A system for distributing electrical power among buildings for managing the distribution of electrical power between at least two distinct buildings,
the system comprising a domestic network in each building, each domestic network being connected to a local network, the local network being connected to a public network,
the system comprising in each building:
a domestic power source for supplying the domestic network,
an inverter connected to the domestic power source in order to convert direct (DC) current generated by the domestic power source into alternating (AC) current,
a battery for storing domestic power and for distributing the domestic power within the domestic network, the battery being supplied by the inverter, and
at least one apparatus operating using the domestic power from the domestic network,
the system comprising a domestic module in each building and a central module connected to each domestic module,
the domestic module configured to regulate power flow in the domestic network between the domestic power source, the inverter, the battery and the at least one apparatus based on a ratio defined by available power (Ed) and consumed power (Ec) on the domestic network, the domestic module being configured to calculate the ratio and to transmit the ratio to the central module,
the central module configured to regulate the power flow among the buildings based on the ratios transmitted by each domestic module so as to allow an exchange of power between a domestic network in excess and a domestic network in deficit.

2. The system according to claim 1, wherein the central module is configured to regulate power flow between the local network and the public network, in such a way that, when the local network is in power deficit, the central module allows an input of power from the public network to the local network.

3. The system according to claim 1, wherein the central module is configured to regulate power flow between the local network and the public network, in such a way that, when the local network is in power excess, the central module allows an output of power from the local network to the public network.

4. The system according to claim 1, wherein the domestic power source is a renewable energy source.

5. The system according to claim 1, wherein the batteries are chosen from lithium batteries or lead batteries.

6. The system according to claim 1, wherein the at least one apparatus is selected from a list consisting of a heat pump, an electric vehicle, a light fixture, an awning, a ventilation system, a heating, and cooling system, multimedia apparatus, an alarm type security device, or a combination thereof.

7. A method for distributing electrical power among buildings for managing the distribution of electrical power between at least two distinct buildings, the method comprising:
   i) providing a system according to claim 1;
   ii) configuring the domestic module of each building so as to calculate the ratio between the available power (Ed) and the power consumed (Ec) on each domestic network;
   iii) providing the ratio of each domestic module to the central module;
   iv) configuring the central module based on the ratios of each domestic module in order to allow regulation of the power flows between the domestic network of each building and the local network, so that, for each building,
      a) when Ed is greater than Ec, the central module allows an output of the excess power from the domestic network of the building to the local network;
      b) when Ed is equal to Ec, the central module blocks the flow of power between the domestic network of the building and the local network; and
      c) when Ed is less than Ec, the central module allows an input of power from the local network to the domestic network of the building in power deficit.

8. The method according to claim 7, wherein the excess power from the domestic network is used to charge the battery of a domestic network in deficit or to supply a domestic network in deficit.

9. The method according to claim 7, wherein the excess power from the domestic network is introduced into the local network then into the public network.

10. The method according to claim 7, wherein the power deficit of the domestic network is satisfied at least in part by an input of power from the public network.

11. The method according to claim 7, wherein the central module is configured to activate the input of electrical power in at least one of the domestic networks in deficit over a predetermined time frame.

12. The method according to claim 7, wherein the central module is configured to compensate a domestic network in deficit based on at least one of:
   meteorological parameters; or
   excess available power in another domestic network.

13. The method according to claim 7, wherein, when a domestic network is in deficit, the central module is configured to use on a priority basis excess power from another domestic network.

14. A method implemented by computer, wherein the method uses a computer program to execute the steps of the method according to claim 7.

15. A computer program comprising instructions which, when the computer program is executed by a computer, are configured to control the system according to claim 1, the computer program being arranged to control the central module so as to regulate the power flow among the buildings and to allow an exchange of power between a domestic network in excess and a domestic network in deficit.

* * * * *